United States Patent [19]

Beck et al.

[11] Patent Number: 4,979,835
[45] Date of Patent: Dec. 25, 1990

[54] PARALLEL SETTING DEVICE FOR A PRINT HEAD SLIDE SUPPORT GUIDE

[75] Inventors: Dieter Beck, Setzingen; Stefan Bischof, Ulm-Jungingen; Erich Steppe, Ulm, all of Fed. Rep. of Germany

[73] Assignee: Mannesmann Aktiengesellschaft, Düsseldorf, Fed. Rep. of Germany

[21] Appl. No.: 242,438

[22] Filed: Sep. 9, 1988

[30] Foreign Application Priority Data

Sep. 9, 1987 [EP] European Pat. Off. ...... 87 730 103.6

[51] Int. Cl.[5] .......................................... B41J 29/00
[52] U.S. Cl. ..................................... 400/59; 400/355
[58] Field of Search ............... 400/55, 58, 59, 352, 400/354, 354.3, 355

[56] References Cited

U.S. PATENT DOCUMENTS

| 3,461,797 | 8/1969 | Trab et al. | 400/58 |
| 4,685,816 | 8/1987 | Mazumder et al. | 400/55 |
| 4,720,200 | 1/1988 | Gomoll et al. | 400/59 |
| 4,784,503 | 11/1988 | Bettini | 400/59 |
| 4,787,759 | 11/1988 | Geis et al. | 400/59 |

FOREIGN PATENT DOCUMENTS

| 2244750 | 3/1974 | Fed. Rep. of Germany . | |
| 30267323 | 3/1982 | Fed. Rep. of Germany . | |
| 49286 | 5/1981 | Japan | 400/59 |
| 52622 | 5/1981 | Japan . | |
| 154091 | 8/1985 | Japan . | |
| 733277 | 7/1955 | United Kingdom . | |

Primary Examiner—David A. Wiecking
Attorney, Agent, or Firm—Horst M. Kasper

[57] ABSTRACT

In a parallel setting device for a print head carriage guide relative to a print medium support (6) in printers, in particular in matrix printers, the print head carriage guide includes a parallel disposable and position adjustable carriage guide axle (5) relative to the print medium support (1) and disposed rearwards relative to the print medium support at the printer frame 1 and a front carriage guide axle (4) adjustable to a minimum distance and disposed opposite to the print medium support (6). The rear and the front carriage guide axle (4,5) in each case are supported in the side plate (2,3) of the printer frame (1). The print medium support (6) is disposed at a level different to that of the front carriage guide axle (4). In order to find a simple and more precise operating solution, which is based on measurable part steps, it is recommended, that the rear carriage guide axle (5) is supported in the side plates (2,3) with cams rings (13) and a parallel positioning between the print medium support (6) and the print head carriage guide is adjustable by one-sided lifting and lowering of the rear carriage guide axle (5).

10 Claims, 2 Drawing Sheets

PARALLEL SETTING DEVICE FOR A PRINT HEAD SLIDE SUPPORT GUIDE

BACKGROUND OF THE INVENTION

1. Field of the Invention

The invention relates to a parallel adjustment device for a print head carriage guide relative to a print medium support in printers, and in particular in matrix printers, where the print head carriage guide comprises a carriage guide axle disposed at the rear of the printer frame and which carriage guide axle can be adjusted parallel to the print medium support and a front carriage guide axle disposed opposite to the print medium support and disposed at a minimum distance and where the rear and the front carriage guide axle in each case is supported in the side plates of the printer frame and where the print medium support is disposed at a height level different from that of the front carriage guide axle.

2. Brief Description of the Background of the Invention Including Prior Art

Such parallel adjustment devices for a print head carriage guide serve the purpose to maintain the distance of the print head along the full length of the print path. The print path is slightly shorter as compared to the length of the print medium support of the same size. Such distance maintenance is of importance in particular for flat print medium supports of importance. On the other hand, the print head motion has to remain always on the same height level of the print head during the print path, that is during the full print path, in order to avoid an inclined line and in addition in order to remain always on the horizontal line of a bundle of vertical tangents. In case of an arched print medium support, that is, in case of a so called print platen. It is of importance in this context that the distance of the print head from the print medium support in an inclined position, for example, in case of needle print heads, has to remain within the stroke of the needle, that is about 0.2 to 0.4 mm.

According to technology employed in the factory, where this invention was made, hitherto employed parallel setting devices formed of axle supports, which axle supports can be shifted in parallel within the plane of the side plate. The setting of such axle supports is difficult as there is lacking any measure for the adjustment path and as the axle support have to be adjusted based on feeling and guess work. Therefore such a parallel positioning is difficult to achieve during assembly, it is time consuming and remains relatively imperfect.

SUMMARY OF THE INVENTION

1. Purposes of the Invention

It is an object of the present invention to furnish a simpler and more precise operating solution, which allows to provide for parallel positioning of two axles for supporting a print head carriage.

It is another object of the invention to provide a adjustment device for setting two axles in parallel, which device is based on adjustable and measurable part steps.

2. Brief Description of the Invention

The invention provides a parallel adjustment device for a print head carriage guide relative to a print medium support in printers. A front carriage guide axle is placed at a minimum distance and disposed opposite to the print medium support. A rear carriage guide axle forming together with the front carriage guide a print head carriage guide. The rear carriage guide axle is settable in parallel to the print medium support. Two side plates are disposed in parallel relative to each other. The back and the front carriage guide axle in each case is supported in side plates of the printer frame. The print medium support is disposed at a level different to that of the front carriage guide axle.

Cams are supporting the rear carriage guide axle in the side platens and provide means for adjusting a parallel setting between print medium support and print head carriage guide by one-sided lifting and lowering of the rear carriage guide axle. A cam ring can form a support for the carriage guide axle. The cam ring is preferably furnished with a bore disposed eccentric relative to a cam ring outer circumference axis. The cam forms a support for a carriage guide axle. The cam ring can be set versus the side plate via a force engaging the outer circumference of the cam ring. A ring shaft of one cam supports a gear system having teeth and an opposite gear system of a respective side plate having teeth, wherein the teeth of the gear system engage into grooves between the teeth of the opposite gear system of the side plate.

The diameter of the axle journal is preferably from about 0.5 to 1.5 times the diameter of the carriage guide axle. An inner ring can be disposed on the axle journal, where the inner diameter of the inner ring mates an outer diameter of the axle journal and where the inner ring has an outer diameter from about 1.5 to 2.5 times an outer diameter of the axle journal. The inner ring rests against one respective side plate.

According to the invention, the rear carriage guide axle is supported in the side plates by way of cams and the parallel adjustment between the print medium support at the print head carriage guide is adjustable by a one-sided lifting or lowering of the rear print head carriage guide. The cams allow precise position, where the rotation of the cams for the setting during the assembly can be taken by individual rotary steps as measure for the set adjustment path.

In addition, the device can be easily produced, by having the cam form of support for the carriage guide axle and that the support is formed as a ring with a bore disposed eccentric relative to the ring axis.

It is further proposed, that the ring is fixed in position relative to the side plate via the outer circumference. For this purpose, only a correspondingly dimensioned opening is required in the side plate.

According to a further improvement relative to the support of the ring and for the more precise adjustability of the cam it is disclosed, that the ring shaft supports a gear and the gear of which engages into the grooves between the teeth of an opposite gear of the side plate.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
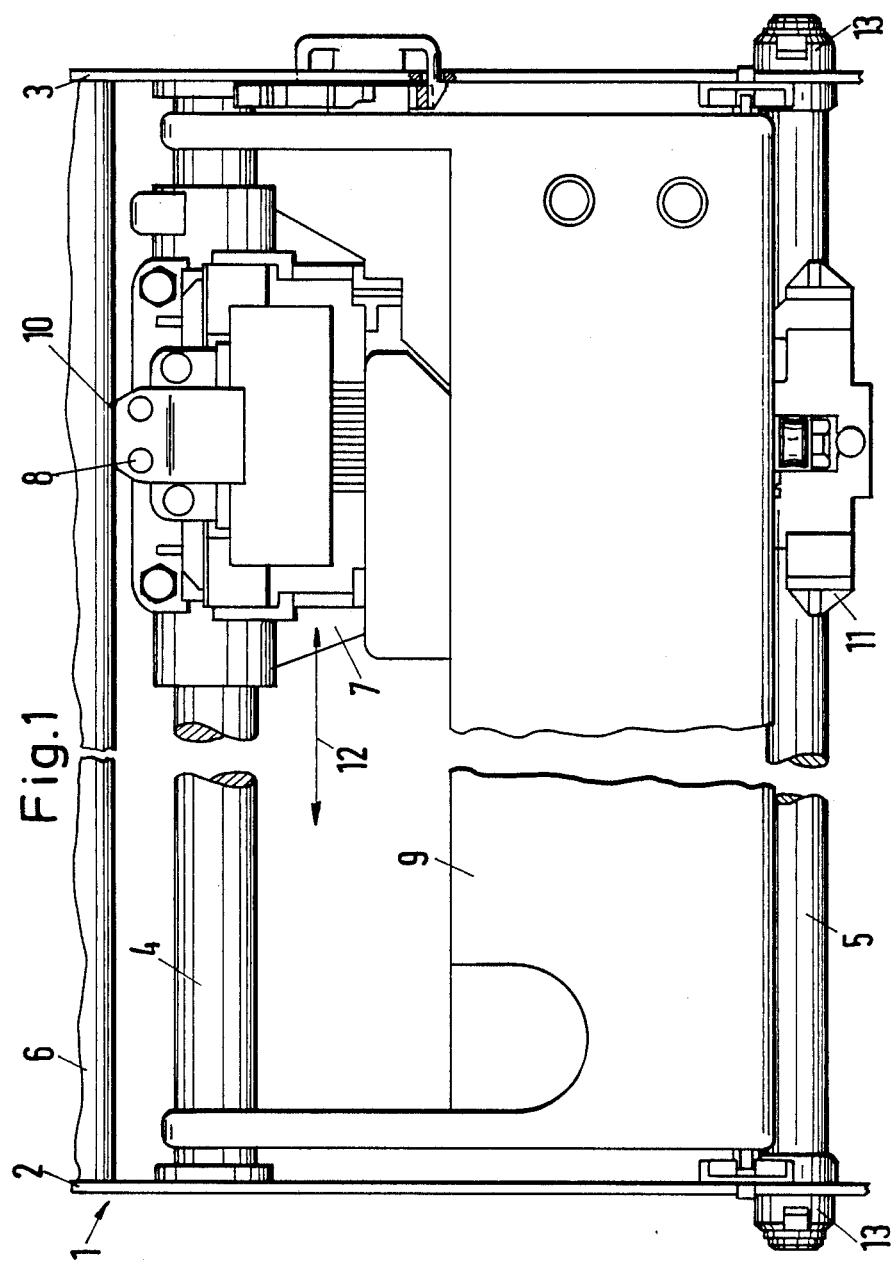
FIG. 1 is a plan top view onto a matrix printer where the casing is removed with a parallel setting device.
Figure 2:
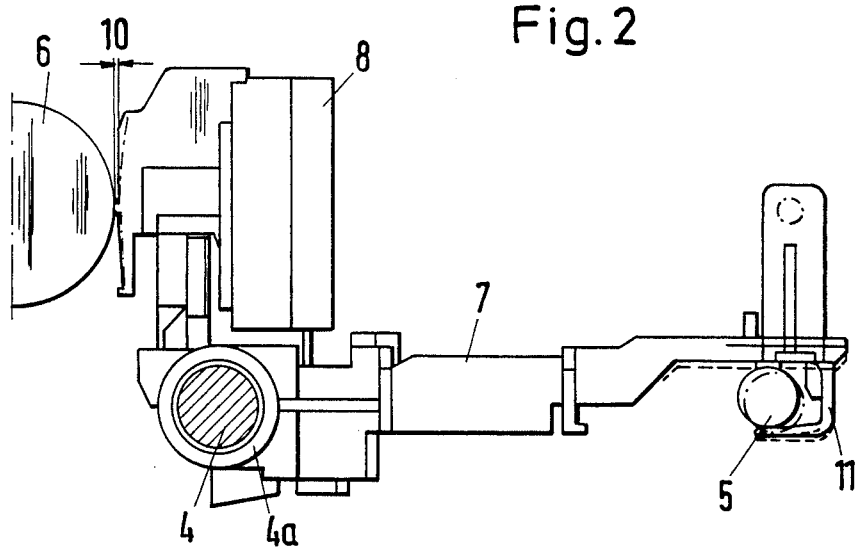
FIG. 2 is a side elevational view onto the print head carriage guide in a partial section.

In accordance with the present invention a parallel adjustment device for a print head carriage guide is provided operating relative to a print medium support 6 in printers, in particular, matrix printers. The print head carriage guide comprises a rear carriage guide axle, settable in parallel to the print medium support 6 and a front carriage guide axle 4 placed at a minimum distance and disposed opposite to the print medium support 6. The back and the front carriage guide axle 4,5 in each case are supported in side plates 2,3 of the printer frame 1. The print medium support 6 is disposed at a level different to the level of the front carriage guide axle 4. The rear carriage guide axle 5 is supported in the side plates 2,3 by way of cams 13 and where the parallel setting between print medium support 6 and the print head carriage guide is adjustable by one-sided lifting and lowering of the rear carriage guide axle 5.

The cam 13 can form a support 14 for the carriage guide axle 4 or, respectively, 5. The support 14 is formed as a ring 16 with a bore 17 disposed eccentric relative to the ring axis 16a. The ring 16 can be set versus the side plate 2,3 via the outer circumference 16b.

The ring shaft 16c preferably supports a gear system 16d having teeth 16e, where the teeth 16e of the gear system 16d engage into the grooves 19a between the teeth of an opposite gear system 19 of the side plate 2,3.

The matrix printer frame 1 comprises the two side plates 2 and 3. A front carriage guide axle 4 and a rear carriage guide axle 5 are placed between the two side platens 2 and 3. According to the nomenclature of this application the front support axle for the carriage is the axle which is close to the print head and the rear axle for support of the carriage is the axle remote from the print head. A print medium support 6 is disposed in the area of the front carriage guide axle 4 in a higher middle axle plane. A print head carriage 7 is guided and supported on the carriage guide axle 4 and 5. A print head 8 is disposed on the print head carriage 7, where the print head carriage 7 is moved exactly and precisely parallel to the print medium support 6. In addition, a colored tape cassette 9 is disposed between the side plates 2 and 3. A colored band of the colored tape cassette 9 moves in the slot 10 between the print head 8 and the print medium support 6 in a circular and endless motion. The print head 8 therefore has to be disposed at an accurate and equal distance relative to the print medium support 6 in the region between the side plates 2 and 3.

The print head carriage 7 is supported on the front carriage guide axle 4 in a bearing 4a radially precisely guiding, whereas the rear carriage guide axle 5 is supported in a fork 11 disposed with its tips toward the print medium support 6 which allows the re-positioning across to the carriage guide direction 12. The rear carriage guide axle 5 is supported substantially free from play in the fork 11 in about vertical direction.

Figure 3:
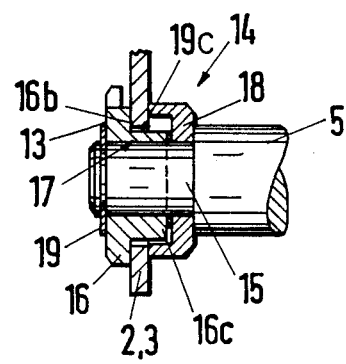
FIG. 3 is a longitudinal section through the support of the rear carriage guide axle and FIG. 4 is a partial sectional view through the support of the rear carriage guide axle.

The rear carriage guide axle 5 is supported in the two side plates 2 and 3 in cams 13. The cam 13 in each case forms a support 14 as illustrated in FIG. 3 in the side plate 2 or, respectively 3. In this case the axle journal 15 rests in a ring 16 with a bore 17 for the axle journal 15 and disposed eccentric relative to the ring axle 16a. An inner ring 18 and an axial spring ring 19 fix the position of the carriage guide axle 5 relative to the side plates 2 and 3.

The adjusted eccentricity of the ring 16 is fixed by the connection between the outer circumference 16b of the ring 16 and the circular opening in the side plates 2 or, respectively, 3. According to a particular advantageous feature illustrated in FIGS. 3 and 4, the ring shaft 16c is supporting a gearing 16d, where the teeth 16e of the gearing 16d engage into the grooves 19a between the teeth of a counter gearing 19c of one of the side plates 2 or 3.

During the parallel setting of the print head carriage 7, relative to the print head 8, relative to the service of the print medium support 6, one of the two cam 13 or both are adjusted as required.

Figure 4:
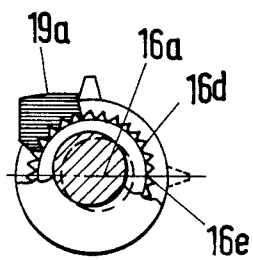

Preferably the axle journal 15 has a diameter which is from about 0.5 to 1.5 times the diameter of the carriage guide axle 5. The inner ring 18 is formed with an inner diameter corresponding to match the outer diameter of the axle journal 15 and with an outer diameter from about 1.5 to 2.5 times the outer diameter of the axle journal 15. The inner ring 18 preferably is flush with the end of the carriage guide axle 5, which is not covered by the axle journal 15 and serves as a stop for the carriage. The inner ring 18 is bent over towards the side plate, preferably furnishing a rounded surface toward the outside relative to the rear carriage guide axle 5 and the side plate 2,3. The space provided by the bending over of the inner ring 18 can be used to provide a space for the cam ring 16 where the bore is disposed eccentric. The bore of the cam ring 16 corresponds in size to the outside of the axle journal and provides support to the axle journal. The turning of the cam ring 16 results in a shifting of the axle journal 15 relative to a direction parallel to the plane of the side plate 2,3. The outer diameter of the opening on the side plate is as large or slightly larger as the carriage support axle 5 in order to allow the carriage support axle to be slid through to the side plate 2,3. The ring 16 is mounted in a position relative to the side plate 2,3, which can be fixed at various points of rotation of the ring 16. The diameter of the ring 16 resting in the side plate corresponds to the outer diameter of the carriage guide axle 5 or is up to 1.2 times the diameter of the carriage guide axle 5. The ring part disposed on the outside of the side plate 2,3 towards axial spring ring 19 has a larger diameter to provide a closing of the opening in the side plate 2,3. The larger outer diameter of the ring 16 can be from 1.1 to 1.5 times the diameter of the circular opening in the side plate 2,3 or preferably from about 1.2 to 1.3 times the diameter of the side opening in the side plate 2, 3. The ring in the outer part with the larger diameter can carry an indicator marker provided as a tooth, which is capable of indicating the relative angular position employed for the cam ring. Two positions of this tooth are illustrated in FIG. 4.

A cam ring can form the cam. A bore of the cam ring advantageously mates an outer diameter of the axle journal. Such bore is disposed eccentric and the distance of the center of the outer diameter of the cam ring from the center of the inner diameter of the cam ring is from about 0.05 to 0.2 of the inner diameter of the cam ring. Means for indication of a rotary position of the cam ring relative to a respective side plate can be employed. The outer diameter of the ring resting in the side plate is preferably from about 1 to 1.2 times the outer diameter of the carriage guide axle.

The cam ring having a section disposed outside of the side plate can have a larger outer diameter, which is from about 1.1 to 1.5 times the diameter of the circular opening in the side plate. The cam ring can have an overall thickness of from about 0.5 to 1.1 times the diameter of the carriage guide axle. An axial spring ring can be attached to an outer end of the carriage guide axle resting against the cam ring for maintaining a relative position of the carriage guide axle and of the cam ring relative to the side plates.

The method for setting a parallel adjustment for a print head carriage guide relative to a print medium support in printers operates as follows. Two side plates are disposed in parallel relative to each other. A front carriage guide axle is placed at a minimum distance and opposite to a print medium support between the two side plates, where the print medium support is disposed at a level different to that of the front carriage guide axle. A rear carriage guide axle forms together with the front carriage guide a head carriage guide between the side plates, such that the rear carriage guide axle is settable in parallel to the print medium support. The front carriage guide axle is supported in each case in side plates of the printer frame. The rear carriage guide axle is supported in the side plates with cams. The position of the rear carriage axle is adjusted by rotation of cam means for adjusting to a parallel setting between print medium support and print head carriage guide by one-sided lifting and lowering of the rear carriage guide axle.

A support is formed for the carriage guide axle with a cam ring providing said cam means. The cam ring is furnished with a bore disposed eccentric relative to the ring axis. The cam ring forms advantageously a support for a carriage guide axle. The cam ring is set versus the side plate via a force engaging the outer circumference of the cam ring. An axial spring ring is attached to an outer end of the carriage guide axle resting against the cam ring for maintaining a relative position of the carriage guide axle and of the cam ring relative to the side plates. Preferably, a gear system is supported at the cam ring. An opposite gear system having teeth is then furnished at the respective side plate, and the teeth of the gear system engage into grooves between the teeth of the opposite gear system.

A rotary position of the cam ring relative to a respective side plate can be read with means for indication. The rotary position of the cam ring can be turned relative to the position indicated by said means for indication until a substantially parallel position of the two carriage guide axles is reached.

It will be understood that each of the elements described above, or two or more together, may also find a useful application in other types of rotary roller system configurations and parallel adjustment procedures differing from the types described above.

While the invention has been illustrated and described as embodied in the context of a parallel setting device for a print head slide support guide relative to a print medium support in printers such as matrix printers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A parallel adjustment device for a print head carriage guide relative to a print medium support (6) in printers, in particular, matrix printers, where the print head carriage guide comprises a rear carriage guide axle, settable in parallel to the print medium support (6) and a front carriage guide axle (4) placed at a minimum distance and disposed opposite to the print medium support (6) and where the back and the front carriage guide axle (4,5) in each case is supported in side plates (2,3) of the printer frame (1) and where the print medium support (6) is disposed at a level different to that of the front carriage guide axle (4), wherein the rear carriage guide axle (5) is supported in the side plates (2,3) by way of cams (13) and where the parallel setting between print medium support (6) and the print head carriage guide is adjustable by one-sided lifting and lowering of the rear carriage guide axle (5) and wherein an inner ring (18) rests against a corresponding one of the side plates (2,3) and fixes the position of the rear carriage guide axle (5) relative to the corresponding side plate (2,3) and wherein the inner ring (18) is flush with the end of the rear carriage guide axle (5), which is not covered by an axle journal and wherein the inner ring (18) serves as a stop for the carriage.

2. The parallel adjustment device according to claim 1 wherein the cam (13) forms a support (14) for the rear carriage guide axle (4) or, respectively, the front carriage guide axle (5) and where the support (14) is formed as a ring (16) with a bore (17) disposed eccentric relative to the ring axis (16a).

3. The parallel adjustment device according to claim 1, further comprising force means, wherein the ring (16) can be set with the force means versus the side plate (2, 3) via the outer circumference (16b).

4. A parallel adjustment device according to claim 1 wherein a ring shaft (16c) supports a gear system (16d), where the teeth (16e) of the gear system (16d) engage into the grooves (19a) between the teeth of an opposite gear system (19) of a corresponding one of the side plates (2,3).

5. A method for setting a parallel adjustment for a print head carriage guide relative to a print medium support in printers comprising the steps of disposing two side plates disposed in parallel relative to each other;

disposing a front carriage guide axle placed at a minimum distance and opposite to a print medium support between the two side plates, where the print medium support is disposed at a level different to that of the front carriage guide axle;

placing an inner ring, formed with an inner diameter corresponding to match the outer diameter of the axle journal, on each of two ends of a rear carriage guide axle for resting against a corresponding one of the side plates and for furnishing a stop for a carriage;

disposing the rear carriage guide axle forming together with the front carriage guide a head carriage guide between the side plates, which rear carriage guide axle is settable in parallel to the print medium support;

supporting the front carriage guide axle in each case in side plates of a printer frame;

supporting the rear carriage guide axle in the side plates with cam means;

adjusting the position of the rear carriage axle by rotation of said cam means for adjusting a parallel setting between print medium support and print head carriage guide by one-sided lifting and lowering of the rear carriage guide axle.

6. The method for setting a parallel adjustment according to claim 5 further comprising forming a support for the carriage guide axles with a cam ring providing said cam means, where the cam ring is furnished with a bore disposed eccentric relative to the ring axis and wherein the cam ring forms a support for the carriage guide axle;

setting the cam ring versus a corresponding one of the side plates via a force engaging the outer circumference of the cam ring;

attaching an axial spring ring to an outer end of the carriage guide axle resting against the cam ring for maintaining a relative position of the carriage guide axle and of the cam ring relative to the side plate.

7. The method for setting a parallel adjustment according to claim 5 further comprising supporting a gear system at the cam means;

disposing an opposite gear system having teeth at the respective side plate, wherein the teeth of the gear system engage into grooves between the teeth of the opposite gear system.

8. The method for setting a parallel adjustment according to claim 5 further comprising reading a rotary position of the cam means relative to a respective side plate with means for indication;

turning the rotary position of the cam means relative to the position indicated by said means for indication until a substantially parallel position of the two carriage guide axles is reached.

9. A parallel adjustment device for a print head carriage guide relative to a print medium support in printers comprising a printer frame;

a print medium support;

a front carriage guide axle placed at a minimum distance and disposed opposite to the print medium support;

a rear carriage guide axle forming together with the front carriage guide axle a head carriage guide, which rear carriage guide axle is settable in parallel to the print medium support;

two side plates disposed in parallel relative to each other, where the back and the front carriage guide axle in each case is supported in said side plates of the printer frame and where the print medium support is disposed at a level different to that of the front carriage guide axle; and cams supporting the rear carriage guide axle in the side plates thereby providing a means for adjusting a parallel setting between said print medium support and the front carriage guide axle by lifting and lowering of the rear carriage guide axle;

two inner rings each corresponding to a respective side plate and surrounding the rear carriage guide axle and disposed immediately neighboring to the respective side plate for resting against a corresponding one of the side plates for fixing the position of the rear carriage guide axle relative to the side plates, wherein each of the inner rings is formed with an inner diameter corresponding to match the outer diameter of the axle journal and having an outer diameter of from about 1.5 to 2.5 times the diameter of the axle journal.

10. A parallel adjustment device for a print head carriage guide relative to a print medium support in printers comprising a printer frame;

a print medium support;

a front carriage guide axle placed at a minimum distance and disposed opposite to the print medium support;

a rear carriage guide axle forming together with the front carriage guide a head carriage guide, which rear carriage guide axle is settable in parallel to the print medium support;

two side plates disposed in parallel relative to each other, where the back and the front carriage guide axle in each case is supported in said side plates of the printer frame and where the print medium support is disposed at a level different to that of the front carriage guide axle; and cams supporting the rear carriage guide axle in the side plates thereby providing a means for adjusting a parallel setting between said print medium support and a front carriage guide by lifting and lowering of the rear carriage guide axle;

two inner rings each corresponding to a respective side plate and surrounding the rear carriage guide axle and disposed immediately neighboring to the respective side plate for resting against a corresponding one of the side plates for fixing the position of the rear carriage guide axle relative to the side plates;

wherein the inner ring is flush with the end of the rear carriage guide axle, which is not covered by an axle journal and wherein the inner ring serves as a stop for the carriage.

* * * * *